United States Patent
Vito

(10) Patent No.: US 10,972,640 B2
(45) Date of Patent: Apr. 6, 2021

(54) ADAPTER FOR INTEGRATING A PROMPT BOX, A CAMERA AND A TRIPOD

(71) Applicant: Linda Vito, San Rafael, CA (US)

(72) Inventor: Linda Vito, San Rafael, CA (US)

(*) Notice: Subject to any disclaimer, the term of this patent is extended or adjusted under 35 U.S.C. 154(b) by 0 days.

(21) Appl. No.: 16/371,141

(22) Filed: Apr. 1, 2019

(65) Prior Publication Data
US 2020/0314296 A1  Oct. 1, 2020

(51) Int. Cl.
*H04N 5/225* (2006.01)
*F16M 11/04* (2006.01)

(52) U.S. Cl.
CPC .......... *H04N 5/2252* (2013.01); *F16M 11/04* (2013.01)

(58) Field of Classification Search
CPC ............................ H04N 5/2252; F16M 11/04
USPC .................................................. 348/373–376
See application file for complete search history.

(56) References Cited

U.S. PATENT DOCUMENTS

| | | | | |
|---|---|---|---|---|
| 5,386,227 A * | 1/1995 | Zeper | ..................... | H04N 5/222 348/375 |
| 6,042,277 A * | 3/2000 | Errington | ............... | G03B 15/05 248/187.1 |
| 6,980,253 B1 * | 12/2005 | Matsui | ................. | H04N 5/2222 348/375 |
| 2007/0040912 A1 * | 2/2007 | Singer | ................. | H04N 5/2222 348/207.99 |
| 2009/0256970 A1 * | 10/2009 | Bilbrey | ............... | H04N 5/2222 348/722 |

* cited by examiner

*Primary Examiner* — Yogesh K Aggarwal
(74) *Attorney, Agent, or Firm* — Dahyee Law Group; Leon E. Jew

(57) ABSTRACT

The invention provides an adaptor for mechanically coupling a prompt box and a video camera to a tripod. In the preferred embodiment, the adaptor is a single piece bracket having a first horizontal portion with a first fastening round hole located at the first horizontal portion's center, a vertical portion with its lower end merged to the first horizontal portion, and a second horizontal portion merged to the vertical portion's upper end. The second horizontal portion has one or more second fastening round roles evenly spaced along the second horizontal portion's longitude. In operation, the prompt box is fastened to the tripod through the first fastening round hole, and the video camera is fastened through one of the second fastening round holes with a screw matching the video camera's tripod mount.

3 Claims, 5 Drawing Sheets

ADAPTER FOR INTEGRATING A PROMPT BOX, A CAMERA AND A TRIPOD

FIELD OF THE INVENTION

This invention generally relates to an adapter for mechanically integrating a video camera, a prompting box and a tripod. In particular, this invention relates to a single piece bracket with holes which can be used to couple a prompting box to a tripod and at the same time couple a video camera to the prompting box by a couple of screw fasteners.

BACKGROUND OF THE INVENTION

A teleprompter is an assembly which enables on-camera talent to look directly into the lens of the camera and read a prepared script text that is generated by a computer software application that allows scrolling up of the text so the reader can keep up with the up-coming text as she reads aloud. The reader sees the text reflected from a two-way mirror and the audience can only sees the scene being shot by the camera through the two-way mirror.

Such type of prompters evolved from the days of cathode ray TV tube displays. As a result, they were heavy off-camera devices that had to be mounted below the front of the camera on a "sled" between the camera and the camera pan and tilt head, which is then mounted on a tripod. These prompters were heavy and time-consuming to mount and operate. Usually it takes a professional about 30 minutes to set-up, align, balance and trim and connect to a personal computer.

With the availability of small size, low-cost and light-weight LCD displays and smart phones, it is now possible to design and build a prompter that is lightweight, mounts in a more industry standard manner and is very quick to mount, set-up and use.

There are several types of the prompters have been developed. Each of them needs a mounting assembly to put the camera with the prompting box together. As an example, U.S. Pat. No. 8,902,355 teaches a mounting assembly that includes a flat mounting bracket, a first shaft, an elongate adjustment bracket, a sub-assembly including a second shaft with a square flat base which is for coupling with an accessory shoe on the camera's top. The flat mounting bracket is secured to the top of the prompting box by three or four mounting screws. The first shaft is a threaded mounting shaft being vertically screwed into the flat mounting bracket and tightened down by an internally threaded fastener such as a wing nut. The elongate adjustment bracket has a slot along its length direction. There is an internally threaded hole on one end of the elongate adjustment bracket. The elongate adjustment bracket is screwed onto the first shaft through the hole to the necessary vertical height and held in place by one or two internally threaded fasteners, such as wing nuts, which may be further tightened with a wrench when the proper vertical height is realized to allow the center of the through-hole to be aligned with the camcorder's lens. The sub-assembly includes a second shaft with a square flat base and fasteners. The second shaft is a dual thread mounting shaft, having an upper portion with a first thread and a lower portion with a second thread. The second shaft is vertical to the square flat base. The lower portion's diameter is larger than the upper portion's diameter. A first fastener, such as an internally threaded wing nut, is screwed onto the upper portion of the second mounting shaft after the upper portion is inserted into the slot on the elongate adjustment bracket. The first fastener is used to secure the second shaft to the elongate adjustment bracket after the distance between the second shaft and the first shaft is adjusted. After the square base is inserted into the accessory shoe which is available on all modern camcorders or video cameras, the second shaft can be secured to the camcorder by screwing down a second fastener, such as a wing nut, along the second thread. A washer is placed over the second fastener. The washer's inner diameter is slightly larger than the second shaft's upper portion's diameter but less than its lower portion's diameter such that the washer can be blocked by the lower portion. In operation, the second shaft's upper portion is inserted into the slot on the elongate adjustment bracket and moved horizontally in the slot until the accessory bracket is aligned with the camcorder's accessory shoe. The first fastener is then fastened to the upper end of the second shaft's upper portion. Then, the flat square base is inserted to the camcorder's accessory shoe. By screwing down the second fastener toward the square flat base, the second shaft is secured to the camcorder. Accordingly, the prompting box is securely coupled to the camcorder.

What is needed is an easy to setup, lightweight, compact yet effective adapter to replace the traditional mounting assembly.

SUMMARY OF THE INVENTION

The invention provides an adapter for mechanically coupling a prompting box and a video camera to a tripod. In the preferred embodiment, the adapter is a single piece bracket having a first horizontal portion with a first fastening round hole located at the first horizontal portion's center, a vertical portion with its lower end connecting to the first horizontal portion, and a second horizontal portion connecting to the vertical portion's upper end. The second horizontal portion has one or more second fastening round roles evenly spaced along the second horizontal portion's longitude. In operation, the prompting box is fastened to the tripod through the first fastening round hole, and the video camera is fastened through one of the second fastening round holes and a screw matching the video camera's tripod mount.

In another preferred embodiment, the adapter further includes an extension bracket for back up use. The extension bracket's exterior measurement is slightly smaller than the second horizontal portion's interior measurement. Therefore, the extension bracket can be fittingly slid into or pulled out from the second horizontal portion. The extension bracket has one or more fastening round roles, which are identical to the second fastening round holes in measurement, evenly spaced along the extension bracket's longitude. After the video camera's lens is properly placed, the video camera is coupled to the brackets by a fastening screw through a pair of matching holes on the brackets.

DETAILED DESCRIPTION OF THE INVENTION

Figure 1:
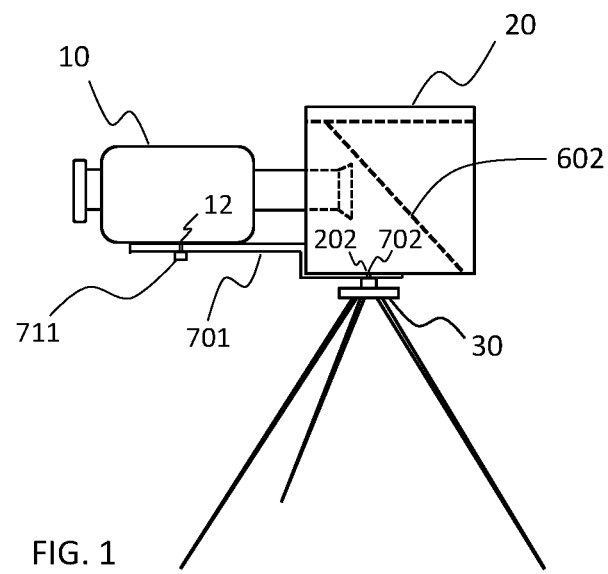
FIG. 1 is a schematic diagram illustrating that a video camera, a prompting box and a tripod are coupled together using an adapter, i.e., a single piece bracket, according to the present invention.

While the present invention may be embodied in many different shapes, forms, designs or configurations, for the purpose of promoting an understanding of the principles of the invention, reference will be made to the embodiments illustrated in the drawings and specific language will be used to describe the same. It will nevertheless be understood that no limitation of the scope of the invention is thereby intended. Any alterations and further implementations of the principle, the essence or the spirit of the invention as described herein are contemplated as would normally occur to one skilled in the art to which the invention relates.

Figure 2:
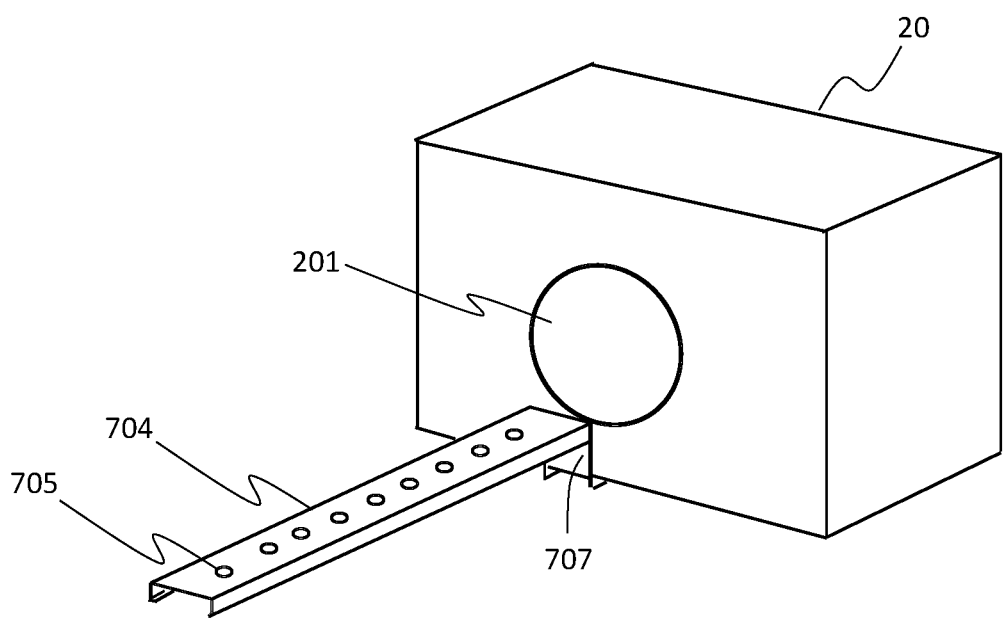
FIG. 2 is a schematic diagram illustrating the single piece bracket being coupled to the prompting box.

The present invention discloses and teaches an adapter for mechanically coupling a prompting box to a tripod and at the same time coupling a video camera to the prompting box. FIG. 1 is a schematic diagram illustrating a video camera 10, a prompting box 20 and a tripod 30 are mechanically coupled together using an adapter, i.e., a single piece bracket 701. The video camera 10 is connected to the bracket 701 by a male fastener 711 coupled to a female tripod mount 12, which is a hole having thread (now shown in FIG. 1). The prompting box 20 is connected to the tripod 30 and at the same time connected to the video camera 10 by securing a screw cap (not shown in FIG. 1) from inside of the prompting box 20 to the tripod's male fastener through the hole 702 of the adapter and the hole 202 of the prompting box 20. FIG. 2 is a schematic diagram illustrating the single piece bracket 701 being coupled to the prompting box 20.

The prompting box 20 includes (1) a housing with a front opening made by folding a single piece cardboard; (2) a flat two way see-through mirror being fittingly placed in the housing; (3) a pair of vertical side supports for holding the see-through mirror, being fittingly placed in the housing; and (4) a supporting frame for holding a smart phone, being horizontally placed in the housing.

Figure 3:
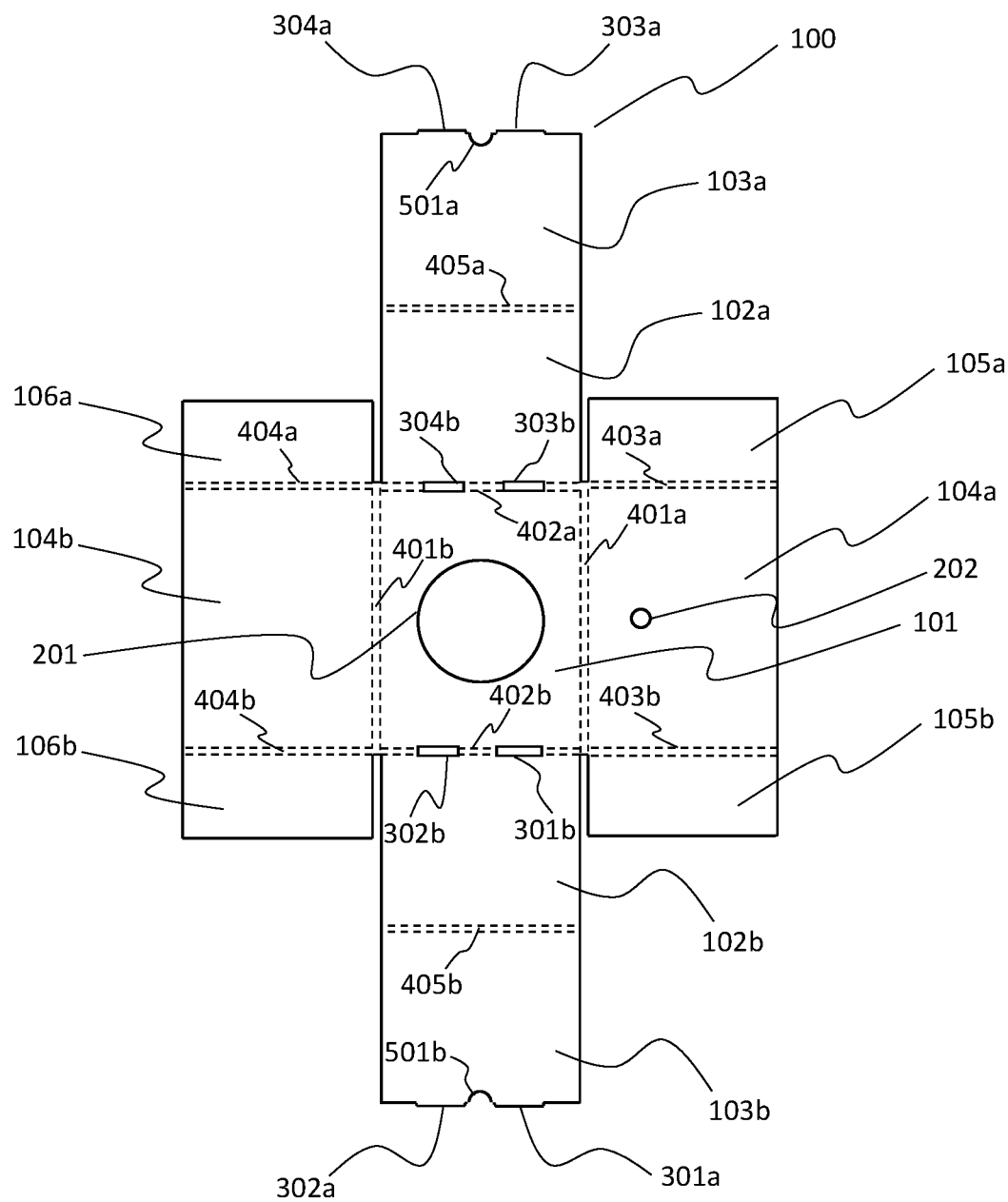
FIG. 3 is a schematic diagram illustrating a top view of a single piece cardboard used for a prompting box which will be coupled to a tripod using the adapter of the present invention.

Referring to FIG. 3, which is a schematic diagram illustrating a top view configuration of a single piece cardboard 100, used for the prompting box according to the present invention. In the middle of cardboard is the rectangular portion 101, which is for the rear side of the housing. In the middle of the portion 101 is a round opening 201 for positing and aligning a video camera.

Attached to the left side of the portion 101 is a side having three portions, which are the portion 104b, the upper extension 106a and the lower extension 106b. The length of portion 106a is identical to the width of the portion 104b. The portion 104b can be folded up against the hinging line represented by dashed lines 401b. In this document, a hinging line means a narrow, elongated area where the cardboard is made flexible such that two neighboring portions of the cardboard can be folded against the hinging line. In other words, due to the flexibility, the narrow, elongated area works like a hinge. The upper extension 106a can be folded up against the hinging line represented by dashed lines 404a. The lower extension 106b can be folded up against the hinging line represented by dashed lines 404b. The portion 106a and the portion 106b have identical measurements. The width of the portion 106a is approximately half the width of the portion 101.

The portion 104a is symmetrical to the portion 104b. Portion 104a can be folded up against the hinging line represented by dashed lines 401a. The upper extension 105a can be folded up against the hinging line represented by dashed lines 403a. The lower extension 105b can be folded up against the hinging line represented by dashed lines 403b. There is a small hole 202 in the portion 104a which is used for securing the prompting box 20 to the adapter 701 (see FIG. 1) which is placed under the prompting box 20, and to the tripod 30, which is placed under the adapter 701. The portion 105a, the portion 105b, the portion 106a and the portion 106b have identical measurements. The width of the portion 105a is approximately half the width of the portion 101.

Attached to the upper side of the portion 101 is a side 102a-103a having two portions, which are portion 102a and an extension 103a attached to each other. Portion 102a can be folded up against the hinging line represented by dashed lines 402a. The extension 103a can be folded up against the hinging line represented by dashed lines 405a. There are two slots 303b and 304b along the hinging line 402a. When the portion 103a is folded against hinging line 405a all the way to the hinging line 402a, the small extruding member 304a on the portion 103a can be fittingly inserted into slot 304b, and the small extruding member 303a can be fittingly inserted into slot 303b. After the portion 103a is folded over, the extruding members 304a and 303a are fittingly locked with the slots 304b and 303b respectively. The semi-circular hallow 501a is for the user's holding to release the portion 103a from the portion 101.

Attached to the lower side of the portion 101 is a side 102b-103b having two portions, which are portion 102b and an extension 103b attached to each other. The side of 102a-103a is symmetrical to the side of 102b-103b. Portion 102b can be folded up against the hinging line represented by dashed lines 402b. The extension 103b can be folded up against the hinging line represented by dashed lines 405b. There are two slots 302b and 301b along the hinging line 402b. When the portion 103b is folded against hinging line 405b all the way to the hinging line 402b, the small extruding member 302a on the portion 103b can be fittingly inserted into slot 302b, and the small extruding member 301a can be fittingly inserted into slot 301b. After the portion 103b is folded over, the extruding members 302a and 301a are fittingly locked with the slots 302b and 301b respectively. The semi-circular hallow 501b is for the user's holding to release the portion 103b from the portion 101.

The small extruding members, or called male members, 301a, 302a, 303a and 304a have identical measurements. The slots, or called female members, 301b, 302b, 303b and 304b have identical measurements. The semi-circular hollows, or called semi-circular concaves, 501a and 501b, have identical measurements.

Figure 4:
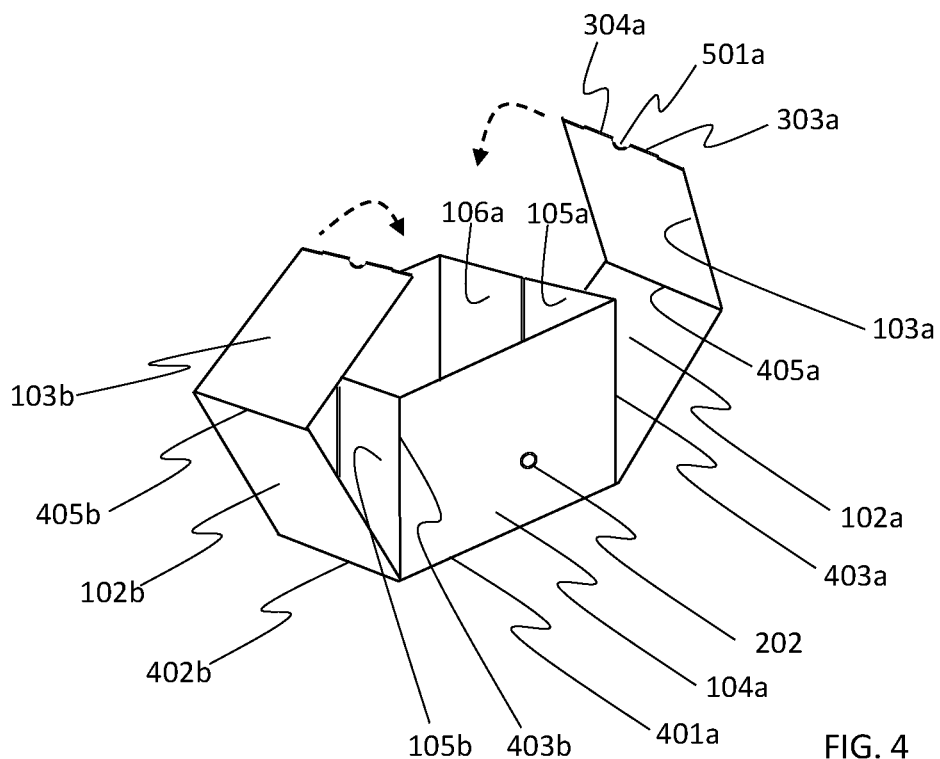
FIG. 4 is a schematic diagram illustrating a perspective view of the single piece cardboard according to FIG. 3 being folded up as a box.

Referring to FIG. 3 together with FIG. 4, which is a schematic diagram illustrating a perspective view of the single piece board being folded up as a box or housing with a front opening. The first step is to fold the portion 104a up against the folding lines 401a such that the portion 104a is vertical to the portion 101. In a similar manner, the portion 104b is folded up against the folding lines 401b such that the portion 104b is vertical to the portion 101.

The second step is to fold the extension portion 105a against the folding line 403a inward such that it is vertical to the portion 101. In a similar manner, the extension portion 106a is folded inward against the folding line 404a, the extension 105b against the folding line 403b, and the extension 106b against the folding line 404b. Extension 105a meets and is aligned with extension 106a. Similarly, extension 105b meets and is aligned with extension 106b.

The third step is to fold the extension 103a over the vertical extension portions 105a and 106a and insert the extruding members 304a and 303a into the slots 304b and 303b respectively. In a similar manner, the extension 103b is folded over the vertical extension portions 105b and 106b, and the extruding members 302a and 301a are inserted into the slots 302b and 301 b respectively.

Figure 5:
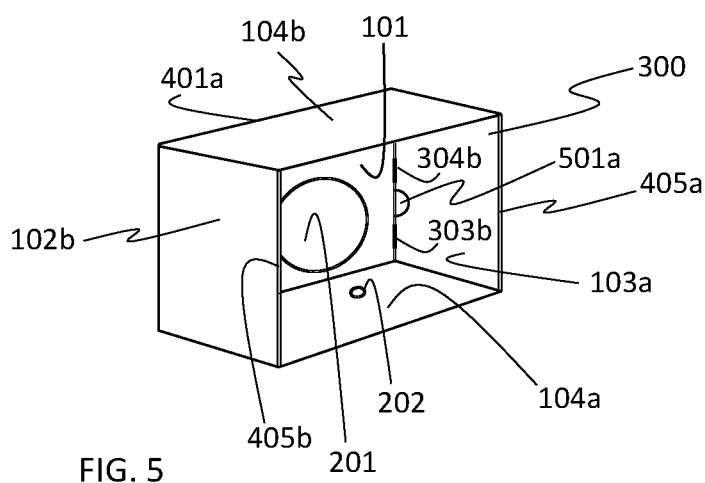
FIG. 5 is a schematic diagram illustrating a perspective view of the housing made of the single piece cardboard according to FIG. 3 and FIG. 4.

Referring to FIG. 5 which is a schematic diagram illustrating a perspective view of the box made of the single piece board 100 according to FIG. 3 and FIG. 4. The box constitutes a rectangular housing 300 with an open front defined by a top side 104b, a bottom side 104a, a rear wall 101 with a round opening 201 for positioning and aligning the camera's lens (not shown in FIG. 5), and a pair of symmetrical opposite side walls, i.e. the portion 102a together with the portion 103a overlaid the extension portions 105a and 106a, and the portion 102b together with the portion 103b overlaid the extension portions 105b and 106b.

The semicircular hallow 501a is for the user's holding to release the portion 103a from the portion 101. The small hole 202 in the portion 104a is for fixing the prompting box to a mounting assembly (not shown in FIG. 3 and FIG. 5).

Figure 6:
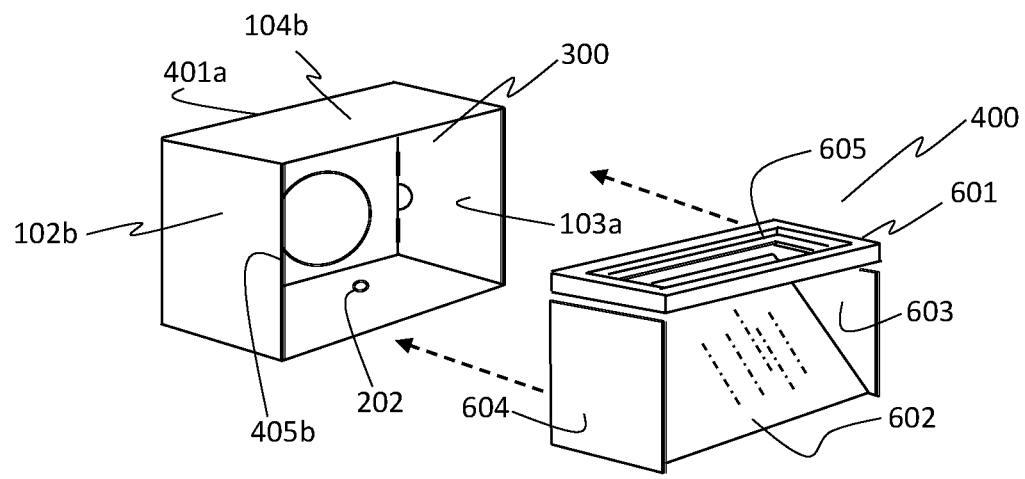
FIG. 6 is a schematic diagram illustrating a perspective view of accessories being slid into the housing according to FIG. 5.

Referring to FIG. 6 which is a schematic diagram illustrating a perspective view of the assembly of the accessories 400 being slid into the housing 300 according to FIG. 5. The assembly accessories 400 includes a rectangular frame 601 for supporting a smart phone, a pair of vertical supports 603 and 604, and a piece of two-way mirror 602. The rectangular frame 601 has a stepped opening 605 for placing a smart phone with its screen facing down to the two-way mirror 602.

Figure 7:
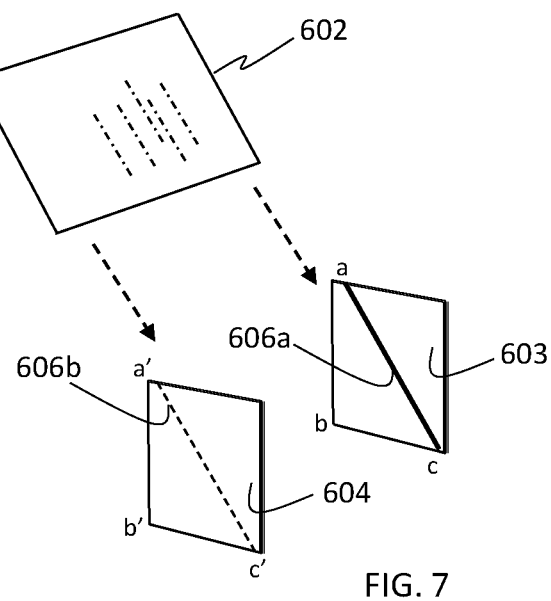
FIG. 7 is a schematic diagram illustrating the two-way mirror being slid in the grooves of a pair of vertical side supports.

Referring to FIG. 7 which is a schematic diagram illustrating the two-way mirror 602 being slid in a pair of side supports 603 and 604. On each of the side supports, there is a groove 606a or 606b. The pair of grooves 606a and 606b, parallel to each other, is used as a guide for the two-way mirror 602 to slide in. The groove 606a is at a 45-degree angle (the angle b-c-a) to the bottom 104a. The groove 606b is also at a 45-degree angle (the angle b'-c'-a') to the bottom 104a. The overall exterior measurements of the assembly of the accessories 400 is approximately same as the inner measurements of the housing 300 made of the single piece board 100, such that the assembly 400 can be fitting slid in the housing 300.

The inclined two-way mirror 602 is a see-through mirror with an optical grade of approximately 60-70% reflective and approximately 30-40% transparent. It is held in position at a 45-degree angle to the display screen of the smart phone which is placed in the frame 601 with its screen facing down to the two-way mirror through the opening 605.

Figure 8:
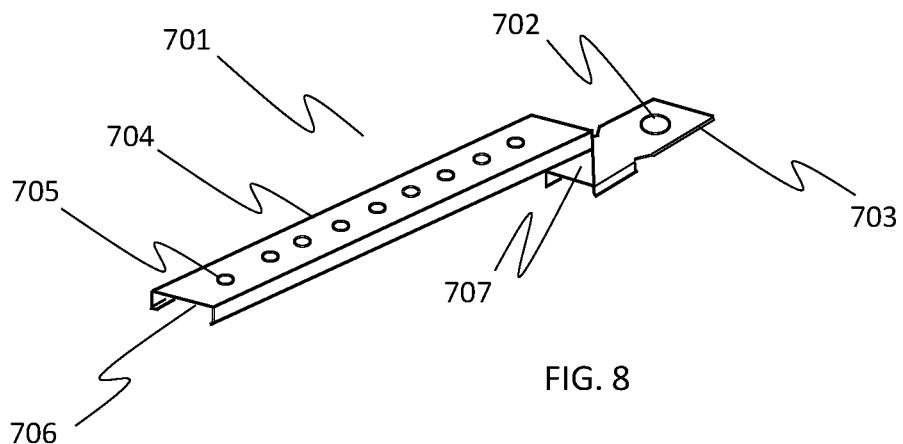
FIG. 8 is a schematic diagram illustrating a stair-shaped single piece bracket for coupling the prompting box illustrated in FIGS. 3-7 to a traditional tripod and at the same time coupling the video camera to the prompting box.

Referring to FIG. 1 along with FIG. 8, illustrated is a stair-shaped single piece bracket 701 that is used for coupling the prompting box 20 illustrated in FIGS. 3-7 to a traditional tripod 30 and at the same time coupling the video camera 10 to the prompting box 20. The single piece bracket 701 includes a first horizontal portion 703 with a first fastening round hole 702 located at the center of the first horizontal portion 703, a vertical portion 707 with its lower end connecting to the first horizontal portion 703, and a second horizontal portion 704 connecting to the upper end of the vertical portion 703. The second horizontal portion 704 has one or more second fastening round roles 705 evenly spaced along the longitude of the second horizontal portion 704. The prompting box 20 is fastened to the tripod 30 through the first fastening round hole 702. The video camera 10 is fastened through one of the second fastening round holes 705 and a screw bolt matching the video camera's tripod mount 12.

Figure 9:
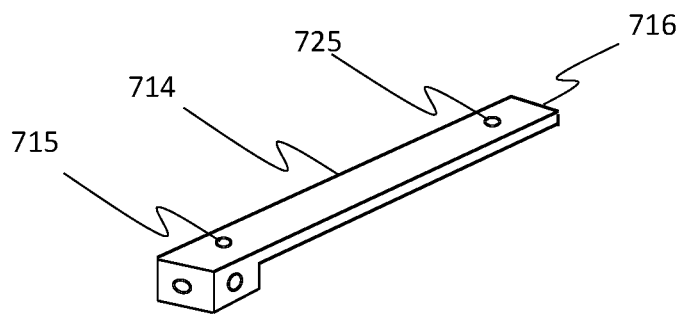
FIG. 9 is a schematic diagram illustrating an extension bracket that can be coupled to the stair-shaped single piece bracket for certain camera that may need a longer support arm to fit its tripod mount.
Figure 10:
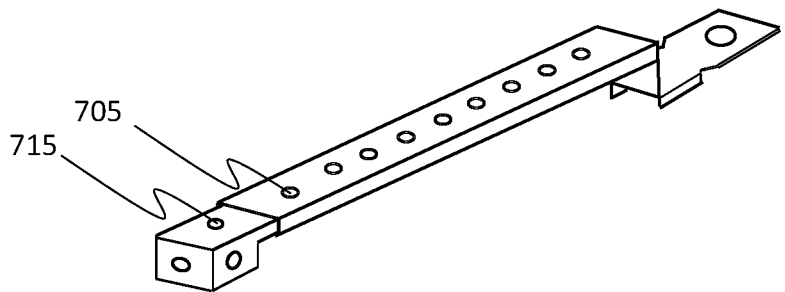
FIG. 10 is a schematic diagram illustrating the extension bracket according to FIG. 9 being inserted into the long arm of the stair-shaped bracket according to FIG. 8.

FIG. 9 is a schematic diagram illustrating an extension bracket 714 that can be coupled to the stair-shaped single piece bracket 701 for certain camera that may need a longer support arm to fit its tripod mount. FIG. 10 is a schematic diagram illustrating the extension bracket 714 being inserted into the long arm, i.e. the second horizontal portion 704 of the stair-shaped bracket 701. In operation, to appropriately fasten the video camera 10 to the prompting box 20, the extension bracket 714 is fittingly slid into the second horizontal portion 704 from its open end 706, and a male screw bolt (not shown in FIGS. 9-10) is used to fasten the exterior bracket 714 through the hole 715 and the tripod mount 12 of the video camera 10. The exterior measurement of the extension bracket 714 is slightly smaller than interior measurement of the second horizontal portion 704. The fourth round hole 725 is used to lock the extension bracket 714 with the second horizontal portion 704 by a male screw bolt (not shown in FIGS. 9-10).

While one or more embodiments of the present invention have been illustrated above, the skilled artisan will appreciate that modifications and adoptions to the embodiments may be made without departing from the scope and spirit of the present invention.

What is claimed is:

1. An adaptor for mechanically coupling a prompting box and a video camera to a tripod, comprising:
   a single piece bracket having a first horizontal portion with a first fastening round hole located at said first horizontal portion's center, a vertical portion with its lower end connecting to said first horizontal portion, and a second horizontal portion connecting to said vertical portion's upper end, wherein said second horizontal portion has at least two second fastening round roles evenly spaced along said second horizontal portion's longitudinal direction, wherein said prompting box is fastened to said tripod through said first fastening round hole, and wherein said video camera is fastened through one of said second fastening round holes and a screw bolt matching said video camera's tripod mount.

2. The adaptor for mechanically coupling said prompting box and said video camera to a tripod according to claim 1, further comprising:

an extension bracket that can be fittingly slid into said second horizontal portion to appropriately fasten said video camera to said prompting box, wherein said extension bracket's exterior measurement is slightly smaller than said second horizontal portion's interior measurement, and wherein said extension bracket has a third-round role through which a screw bolt being coupled to said video camera's tripod mount.

3. The adaptor for mechanically coupling said prompting box and said video camera to a tripod according to claim 1, further comprising:

a single piece cardboard folded into a rectangular housing, said rectangular housing having an open front defined by a pair of symmetrical opposite sides, a top, a bottom, and a rear side with a round opening for positioning and aligning said camera's lens; and an inner assembly of accessories being fittingly placed in said rectangular housing, said inner assembly comprising a see-through mirror being placed between a pair of vertical side supports parallel to each other, said see-through mirror being at a 45-degree angle to said bottom, and a rectangular frame for holding a smart phone being horizontally placed on the upper edges of said pair of vertical side supports, said smart phone's screen facing downward to said see-through mirror through said rectangular frame's opening;

wherein said single piece cardboard is configured to a shape as: (1) a first rectangular portion to be said rear side with said round opening at its center; (2) a second rectangular portion immediately to the left of said first portion to be said top; (3) a third rectangular portion, with its length identical to said second rectangular portion's width and with its width approximately half of said first rectangular portion's width, to be said second rectangular portion's upper extension; (4) a fourth rectangular portion, symmetrical to and with identical measurements of said third rectangular portion, to be said second rectangular portion's lower extension; (5) a fifth rectangular portion symmetrical to and with identical measurements of said second rectangular portion and immediately to the right of said first portion to be said bottom, and a hole on said fifth rectangular portion for fixing said rectangular housing to said mounting and adjusting hardware assembly; (6) a sixth rectangular portion, with its length identical to said fifth rectangular portion's width and with its width approximately half of said first rectangular portion's width, to be said fifth rectangular portion's upper extension; (7) a seventh rectangular portion, symmetrical to and with identical measurements of said sixth rectangular portion, to be said fifth rectangular portion's lower extension; (8) an eighth rectangular portion immediately to the upper edge of said first portion; (9) a ninth rectangular portion immediately to the upper edge of said eighth portion; (10) a tenth rectangular portion symmetrical to said eighth rectangular portion and immediately to the lower edge of said first portion; (11) an eleventh rectangular portion symmetrical to said ninth rectangular portion and immediately to the lower edge of said tenth portion; (12) a first slot and a second slot being evenly located at a first hinging line between said first rectangular portion and said eight rectangular portion; (13) a third slot and a fourth slot being evenly located at a second hinging line between said first rectangular portion and said tenth rectangular portion; (14) at said ninth rectangular portion's exterior edge being a first male member which can be fittingly inserted into said first slot, a second male member which can be fittingly inserted into said second slot, and a first semi-circular concave between said first and second male members; and (15) at said eleventh rectangular portion's exterior edge being a third male member which can be fittingly inserted into said third slot, a fourth male member which can be fittingly inserted into said fourth slot, and a second semi-circular concave between said third and fourth male members; and wherein said rectangular housing being defined by (16) said second rectangular portion being folded up along a third hinging line between said second rectangular portion and said first rectangular portion, being vertical to said first rectangular portion; (17) said fifth rectangular portion being folded up along a fourth hinging line between said fifth rectangular portion and said first rectangular portion, being vertical to said first rectangular portion; (18) said third rectangular portion being folded inward along a fifth hinging line between said third rectangular portion and said second rectangular portion, said fourth rectangular portion being folded inward along a sixth hinging line between said fourth rectangular portion and said second rectangular portion, said sixth rectangular portion being folded inward along a seventh hinging line between said sixth rectangular portion and said fifth rectangular portion, and said seventh rectangular portion being folded inward along an eighth hinging line between said eighth rectangular portion and said fifth rectangular portion; (19) said third rectangular portion and said sixth rectangular portion being aligned to each other and vertical to said first rectangular portion, and said fourth rectangular portion and said seventh rectangular portion being aligned to each other and vertical to said first rectangular portion; (20) said ninth rectangular portion being folded along a ninth hinging line between said ninth rectangular portion and said eighth rectangular portion and folded over said third rectangular portion and said sixth rectangular portion, and symmetrically, said eleventh rectangular portion being folded along a tenth hinging line between said eleventh rectangular portion and said tenth rectangular portion and folded over said fourth rectangular portion and said seventh rectangular portion; (21) said first and second male members being inserted said first and second slots respectively, and symmetrically, said third and fourth male members being inserted into said third and fourth slots respectively; (22) a first hollow defined by said first semi-circular concave being used for a user to release said ninth rectangular portion from said first rectangular portion, and symmetrically, a second hollow defined by said second semi-circular concave to release said eleventh rectangular portion from said first rectangular portion.

* * * * *